(12) United States Patent
Guha et al.

(10) Patent No.: US 8,199,683 B2
(45) Date of Patent: Jun. 12, 2012

(54) FULL-DUPLEX WIRELESS COMMUNICATION USING A SINGLE TRANSMITTER

(75) Inventors: Ratul K. Guha, Kendall Park, NJ (US); Wai Chen, Parsippany, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 388 days.

(21) Appl. No.: 12/700,123

(22) Filed: Feb. 4, 2010

(65) Prior Publication Data

US 2010/0309823 A1 Dec. 9, 2010

Related U.S. Application Data

(60) Provisional application No. 61/184,968, filed on Sep. 8, 2009.

(51) Int. Cl.
*H04B 7/005* (2006.01)
(52) U.S. Cl. ......... 370/278; 370/276; 455/39; 455/41.2; 455/91; 455/115.1; 455/121
(58) Field of Classification Search .......... 370/276–278; 455/39, 41.1–41.2, 91, 115.1, 121
See application file for complete search history.

(56) References Cited

U.S. PATENT DOCUMENTS

| | | | |
|---|---|---|---|
| 6,711,418 B1 | 3/2004 | Wang et al. | |
| 7,228,108 B2 * | 6/2007 | Ayatsuka et al. | 455/73 |
| 2002/0119797 A1 | 8/2002 | Woodhead et al. | |
| 2002/0193087 A1 * | 12/2002 | Kim | 455/127 |
| 2003/0210194 A1 * | 11/2003 | Gilmore | 343/725 |
| 2004/0087278 A1 | 5/2004 | Lin et al. | |
| 2006/0114129 A1 * | 6/2006 | Henty | 341/22 |

OTHER PUBLICATIONS

International Search Report, dated Sep 2, 2010 (2 pages).

* cited by examiner

*Primary Examiner* — Hassan Kizou
*Assistant Examiner* — Siming Liu
(74) *Attorney, Agent, or Firm* — Philip J. Feig

(57) ABSTRACT

A system for fall-duplex communication using a single transmitter is presented. The system comprises a base station with a signal and data processor, peripheral detectors each placed at a distance from the transmitting antenna, and a mobile device having at least a dipole antenna having a switch and a loop antenna having a switch, wherein the sending device modulates the shorting state, i.e., the electromagnetic configuration, of the wire and coil antennas using the switches, the modulating resulting in alteration in load at the base station. This alteration can be calculated based on input from the transmitting antenna and the detectors, each input having time coding. The input from the transmitting antenna can be magnitude of propagated signal and the input from each detector can comprise a quantified signal level and the quantified signal level time-delayed by propagation time. The detectors can be peripheral signal level detecting antennas.

11 Claims, 4 Drawing Sheets

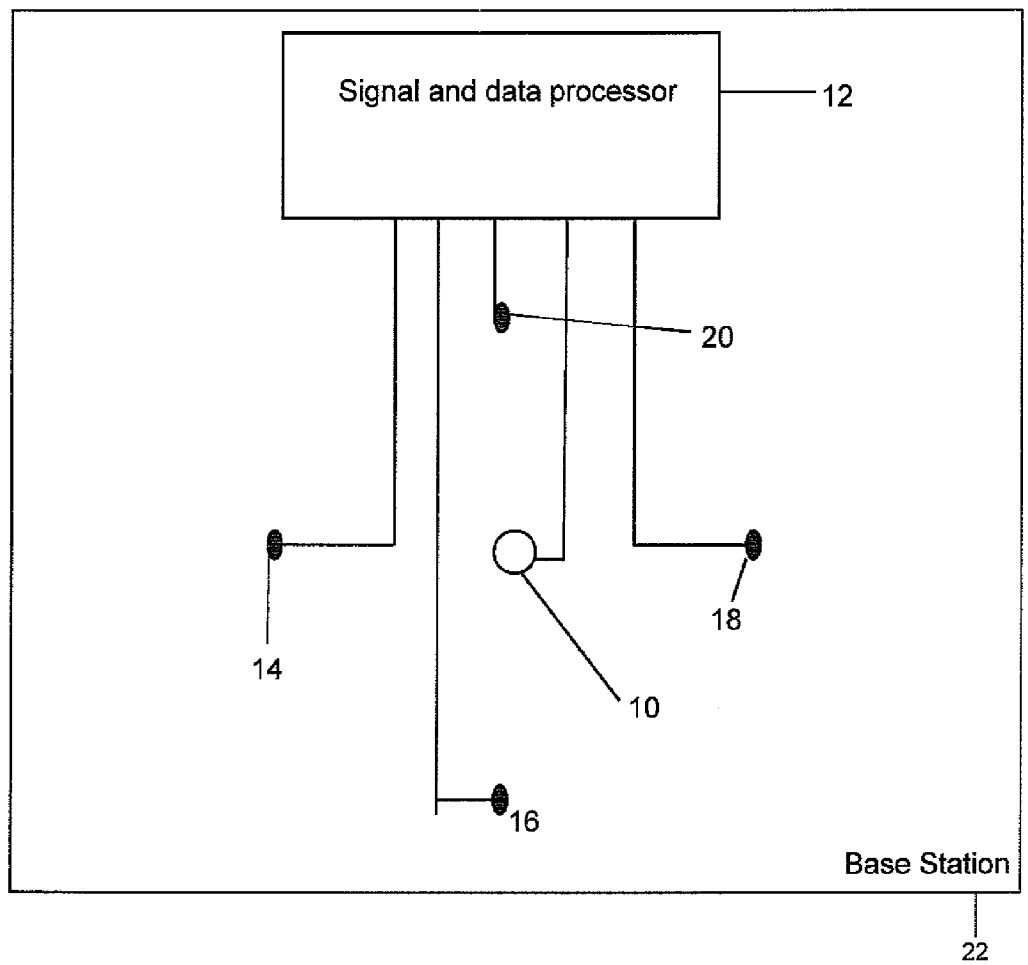
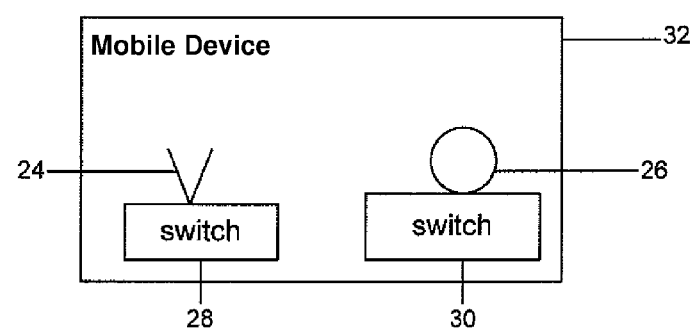
FIGURE 1

FULL-DUPLEX WIRELESS COMMUNICATION USING A SINGLE TRANSMITTER

CROSS REFERENCE TO RELATED APPLICATIONS

The present invention claims the benefit of U.S. provisional patent application 61/184,968 filed Jun. 8, 2009, the entire contents and disclosure of which are incorporated herein by reference as if fully set forth herein.

FIELD OF THE INVENTION

The present invention relates generally to wireless communication, cellular communication, and automotive communication.

BACKGROUND OF THE INVENTION

In existing communication methods, the information sender transmits signals that are decoded at the information receiver. In near-field RF technology, magnetic effects such as induction balance are used in metal detectors that use very low frequency pulses. Communication through magnetic induction has been known. Its use in near-field localization devices has been studied and commercially leveraged. However, there is a need for far-field RF technology and communication capabilities that require very little power usage at the mobile device. The present invention supports full-duplex wireless communication between two devices using only a single transmitting antenna.

Reflection-based communication has also been studied. For example, rotating mirrors for reflecting light waves in optical switches is known. Also known is radar technology, which is extensively used for detection and tracking.

SUMMARY OF THE INVENTION

The inventive system and method enables full duplex communication between a base station and a mobile device where only the base station has a transmitting antenna. For forward or downlink communication, information from the base station that has a transmitting antenna is sent through signals. The novel reverse or uplink communication, i.e. information sent by the mobile device that does not have a transmitting antenna, leverages loading effect on antenna circuitry based on the existence of a remote conductor. Accuracy is improved through the use of time windows. The term "transmitter" generally indicates the source of electromagnetic energy and also the sender of information. In this novel system and method, the transmitter or sender of information is different from the active sender of electromagnetic energy. Accordingly, based on the inventive method, a full-duplex communication system can be set up where only one end actively transmits energy. In one embodiment, the base station may use multiple orthogonal frequencies to support both forward and reverse communication. The system and method can be used, for example, to eliminate a signal transmitter in a cellular phone.

The inventive system, in an exemplary embodiment, has a base station comprising a transmitting antenna, detectors or peripheral antennas each placed at a distance from the main transmitting antenna signal, and data processor receiving and processing signals from the transmitting antenna and the detectors, and also has a mobile device having at least a dipole antenna having a switch and a loop antenna having a switch, wherein the mobile device modulates the electromagnetic configuration of the dipole and loop antennas using the respective switches, the modulating resulting in alteration in load at the base station. The signal and data processor can calculate the alteration in load based on input from the transmitting antenna and the peripheral antennas, each input having time coding. The input from the transmitting antenna can be magnitude of propagated signal and the input from each detector can comprise a quantified signal level and the quantified signal level can be time-delayed by propagation time. The detectors can be signal level detecting antennas. In one embodiment, the base station may be a cellular base station. In another embodiment, the base station could be a wireless access point for a local area network.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 1 is a schematic diagram of the present invention;

DETAILED DESCRIPTION

Figure 2:
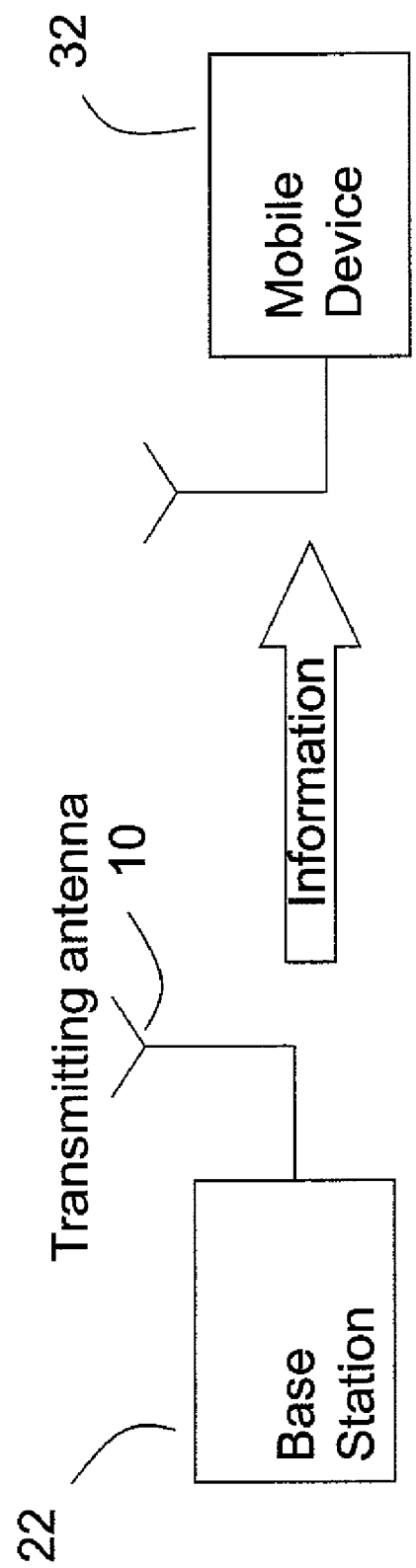
FIG. 2 shows an embodiment having forward communication where a base station with a transmitting antenna transmits signals and sends information to a mobile device.

The invention comprises a method and a system to enable full-duplex communication with a single transmitter, such as a transmitting antenna.

FIG. 1 is a schematic diagram of the inventive system, illustrating its components. The exemplary system shown in FIG. 1 has a transmitting antenna 10, producing a transmitter signal e.g., pulses at the Gigahertz range, connected to a signal and data processor 12, and four peripheral signal level detecting antennas 14, 16, 18 and 20, each placed at a distance from transmitting antenna 10. The transmitting antenna 10 combined with a signal and data processor 12 and the detectors 14, 16, 18 and 20 form the base station 22. In one embodiment, all of the detectors 14, 16, 18 and 20 are equidistant from transmitting antenna 10. Each peripheral signal level detecting antenna 14, 16, 18 and 20 is connected to the signal and data processor 12. The number of peripheral signal level detecting antennas can vary and is not restricted to four as shown. The exemplary system also includes the mobile device, 32, a dipole or wire antenna 24, a loop or coil antenna 26, an electronic switch 28 giving programmed short circuiting of dipole antenna 24, i.e. change in the electromagnetic configuration, and an electronic switch 30 giving programmed short circuiting of the coil antenna 26, i.e. change in the electromagnetic configuration. The mobile device 32 can be a mobile telephone, a mobile set, a laptop with wireless capability or the like.

Transmitter antenna 10 generates pulses for a propagated signal. Each pulse unit has coded absolute time information. The magnitude of the propagated signal is measured and this data forms one of the inputs to the signal and data processor 12. Items 14, 16, 18 and 20 are detectors, such as peripheral signal level detecting antenna, each of which receives the signal and quantifies the signal level at its respective location. Along with the measurement of the signal level, the pulses received attach a coded timing information. Items 14, 16, 18 and 20 are located at a distance from the transmitting antenna 10 such that each of their locations is at least the minimum distance from the transmitter antenna 10 that can be considered as the "far field" (wavelength/2*pi).

The items 14, 16, 18 and 20 receive the signal following a small time interval after the transmitter antenna 10 pulse. The delay corresponds to the propagation time between the transmitting antenna 10 and the detectors 14, 16, 18 and 20. Each pulse from the transmitting antenna 10 travels to the mobile device 32. The power absorption by the dipole antenna 24 and the loop antenna 28 leads via loading effect to another signal at the detectors 14, 16, 18 and 20 with a time delay. Depending upon the location of the mobile device 32 relative to the detectors 14, 16, 18 and 20, for each transmitted pulse, a pulse will be measurable at the detectors 14, 16, 18 and 20 each having a different time delay.

The dipole antenna 24 is provided with a programmable electronic shorting switch 28 and the loop antenna 26 with another programmable shorting switch 30. The switches 28 and 30 are synchronized. However the inductance of the loop antenna 26 prolongs the switched effect and therefore switch 28 has to be set for a longer time period than switch 30.

The signal and data processor 12 receives one signal from the transmitting antenna 10, e.g., the magnitude of the propagated signal, and two signals per transmitter pulse from each of the detectors 14, 16, 18 and 20. As a result, there are nine data inputs to the signal and data processor 12, each input having time coding. Based on these nine inputs, the processor 12 calculates the switching action at the mobile device 32. The calculations can be performed using software stored on computer readable medium, such as a computer readable storage medium.

The switching action performed at the mobile device 32 is calculated by the signal and data processor 12 by the power loading effect when items 28 and 30 go to the electrical shorting state. For this purpose, the voltage equivalent of the transmitter power and the detector signals are compared by means of a set of high gain and high Common Mode Rejection Ratio (CMRR) differential amplifiers (not shown). Because the differences are small, there will be a noise effect. The noise is partially reduced by cross correlation and creating "time windows" because the time delay in transmission from the transmitter 10 to detectors 14, 16, 18 and 20 is known and also the loading effect delay from the mobile device 32 to the detectors falls within a certain time range. This is because the mobile device 32 will be within an ascertained distance range from the transmitting antenna 10.

FIG. 2 shows a forward or downlink communication, in which a base station 22 that also has a transmitting antenna 10, transmits signals and sends information to a mobile device 32. Here the base station acts as sender and the mobile device acts as receiver. In one embodiment, the antenna 24 and 26 function as receiver for the downlink communication.

Figure 3:
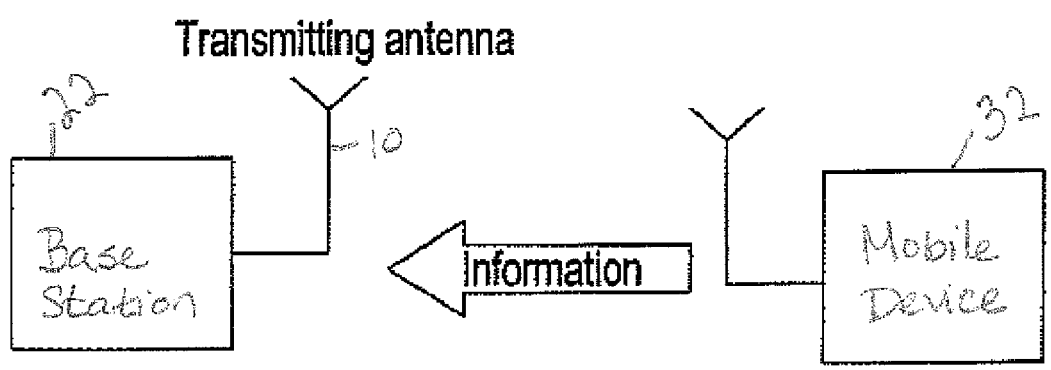
FIG. 3 shows the reverse communication system of the embodiment shown in FIG. 2, where the base station with a transmitting antenna transmits signals and receives information from an information sending device that does not have a transmitting antenna.

FIG. 3 shows the reverse or uplink communication system, in which a base station 22 with a transmitting antenna 10, such as a cellular base station, transmits signals and receives information from a mobile device 32 that does not have a transmitting antenna. As shown, the transmitting antenna 10 is located at the base station 22. This is a departure from traditional communication systems where a transmitter is needed at both the information sending device and the information receiving device. Reflection based communication falls under this paradigm. In one embodiment, the downlink and the uplink communication may be achieved using non-overlapping time slots at the base station 22. In another embodiment, the downlink and the uplink communication may be achieved using orthogonal frequencies. Accordingly, full-duplex communication is achieved.

Figure 4:
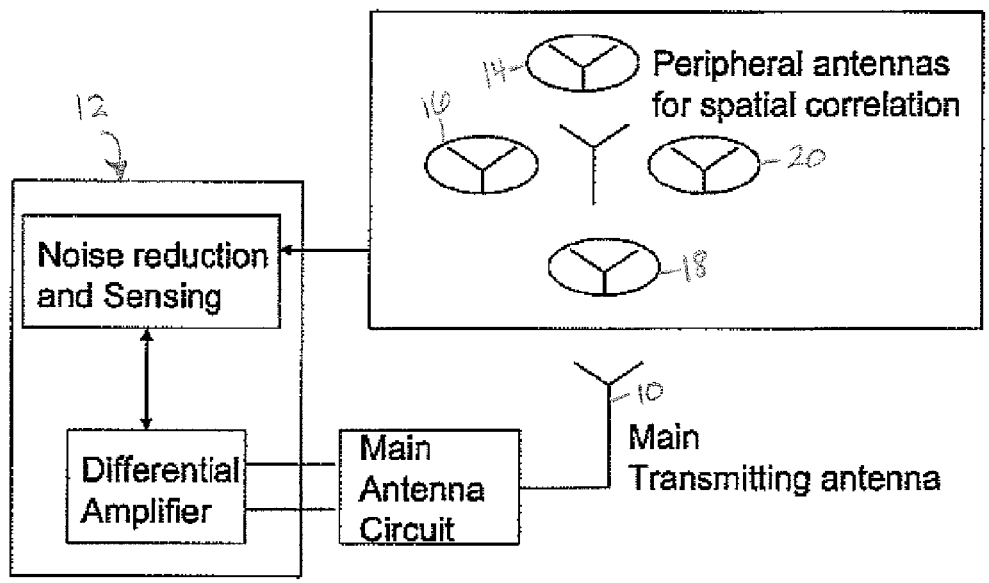
FIG. 4 shows the architecture at the base station of the communication system in accordance with an embodiment of the present invention.

FIG. 4 shows the architecture at the base station 22. A regular transmitting antenna 10 is supplemented by peripheral antennas 14, 16, 18 and 20 to achieve spatial diversity. A differential amplifier with a high CMRR measures voltage fluctuations as a result of remote loads. This results in communication from the mobile device to the base station. The measurement can be enhanced by the spatial correlation and noise reduction achieved from the peripheral antennas. Recent advances such as sub-picowatt precision radiometry using superconducting transition-edge sensor bolometers will aid in the development of the inventive circuit.

Figure 5:
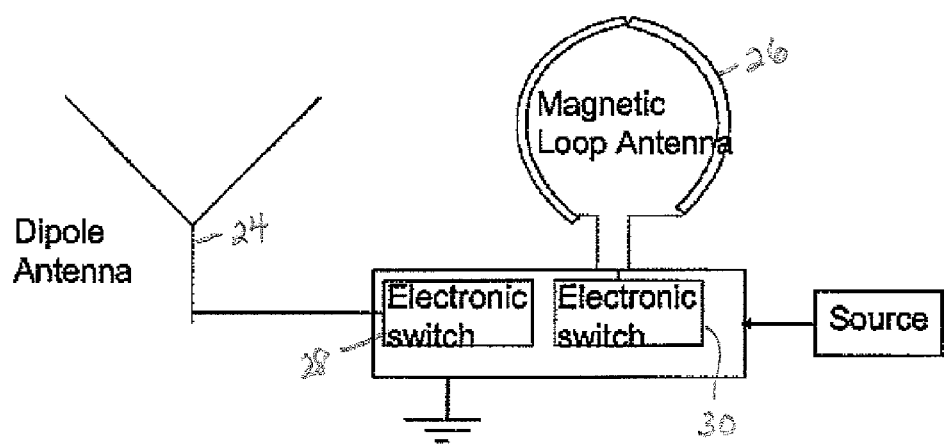
FIG. 5 shows the architecture at the mobile device of a communication system in accordance with an embodiment of the present invention.

FIG. 5 shows the architecture at the mobile device 32. Multiple antennas 24, 26 are each controlled through an electronic switch 28, 30, such as by using a MOSFET switch. The switch 28, 30 is in turn modulated by the information source. This source could be a data stream, a voice stream, or any appropriate source of information. The shorting of antennas 24, 26, which can be performed using their respective electronic switches 28, 30, results in alterations in the power required to drive the antenna circuit at the other end. The presence of both a dipole antenna 24 and a loop antenna 26 support the effect on both the electronic (E) and the magnetic (B) field.

In one embodiment of the inventive method, the mobile device 32 modulates the electromagnetic configuration of local antennas 24, 26. This results in alterations in the load at the transmitting antenna 10 and the detectors 14, 16, 18 and 20 at the base station 22. The inputs are sent to the signal and data processor 12 for evaluation. Time windows are further used to reduce the noise and achieve estimation. Advantageously, this can enable two way communication with only one transmitting antenna. The battery consumption at the mobile terminal can be significantly reduced, extending battery life. Further, the system may reduce radiation influence.

This inventive solution to the need for full-duplex communication using a single transmitter is novel in part because of the observation of the effect of conductor in a microwave oven on line voltage.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for full-duplex communication using a single transmitter, comprising:
    a base station comprising:
        a transmitting antenna;
        a plurality of detectors each placed at a distance from the transmitting antenna;
        a signal and data processor receiving and processing signals from the transmitting antenna and the detectors; and
    a mobile device having at least a dipole antenna having a switch and a loop antenna having a switch, wherein the mobile device modulates electromagnetic configuration of the dipole antenna and the loop antenna using the respective switches, said modulating resulting in alteration in load at the plurality of detectors of the base station.

2. The system of claim 1, wherein the signal and data processor calculates the alteration in load based on input from the transmitting antenna and one or more of the detectors, each input having time coding.

3. The system of claim 2, wherein the input from the transmitting antenna is magnitude of propagated signal and the input from each detector comprises a first input of a quantified signal level and a second input of the quantified signal level time-delayed by propagation time.

4. The system of claim 1, wherein the detectors are peripheral signal level detecting antennas.

5. The system of claim 1, wherein the switches are MOSFET switches.

6. A method for full-duplex communication using a single transmitter, comprising:
    transmitting pulses from the transmitting antenna of a base station;
    modulating electromagnetic configuration of a wire antenna and a coil antenna using respective switches at the mobile device;
    altering, resulting from said modulating, load at detectors in the base station.

7. The method of claim 6, further comprising calculating the alteration in load based on input from the transmitting antenna and one or more of the detectors, each input having time coding.

8. The method of claim 7, wherein the input from the transmitting antenna is magnitude of propagated signal and the input from each detector comprises a first input of a quantified signal level and a second input of the quantified signal level time-delayed by propagation time.

9. The method of claim 7, where the voltage equivalent of transmitter power and the input from each detector are compared using high gain and high common mode rejection ratio differential amplifiers.

10. The method of claim 7, wherein the detectors are peripheral signal level detecting antennas.

11. The method of claim 7, wherein the switches are MOSFET switches.

* * * * *

UNITED STATES PATENT AND TRADEMARK OFFICE
CERTIFICATE OF CORRECTION

PATENT NO. : 8,199,683 B2  
APPLICATION NO. : 12/700123  
DATED : June 12, 2012  
INVENTOR(S) : Guha et al.

Page 1 of 1

It is certified that error appears in the above-identified patent and that said Letters Patent is hereby corrected as shown below:

On the Title Page, item (57), under "ABSTRACT", in Column 2, Line 1, delete "fall-duplex" and insert -- full-duplex --, therefor.

In the Claims

In Column 6, Lines 24-32, in Claim 6, delete "A method ......... at detectors in the base station." and insert -- A method for full-duplex communication between a base station and a mobile device using a single base station transmitting antenna, comprising: transmitting pulses from the transmitting antenna of the base station; modulating electromagnetic configuration of a wire antenna and a coil antenna of the mobile device using respective switches at the mobile device; altering, resulting from said modulation, load at detectors in the base station. --, therefor.

In Column 6, Line 42, in Claim 9, delete "where" and insert -- wherein --, therefor.

Signed and Sealed this  
Fourteenth Day of April, 2015

Michelle K. Lee  
*Director of the United States Patent and Trademark Office*